J. H. WESTCOTT.
Chucks.
No. 136,349.    Patented Feb. 25, 1873.
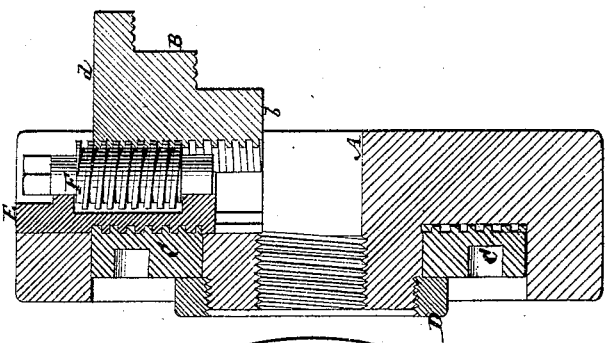
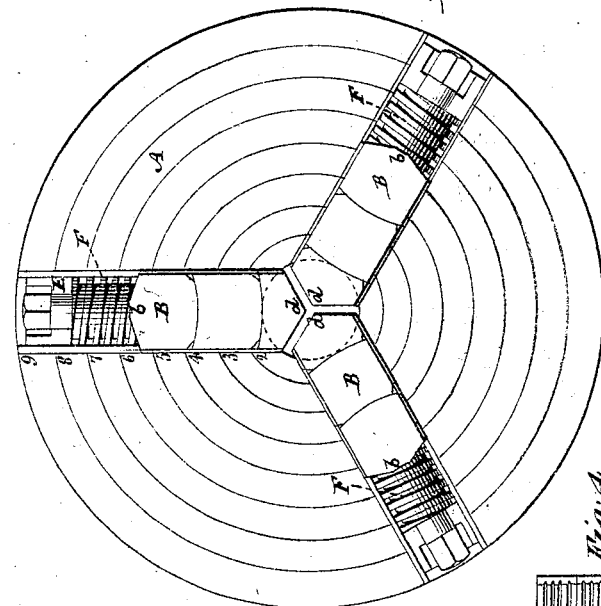
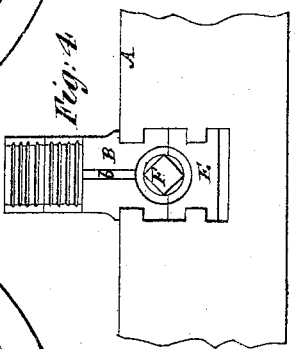
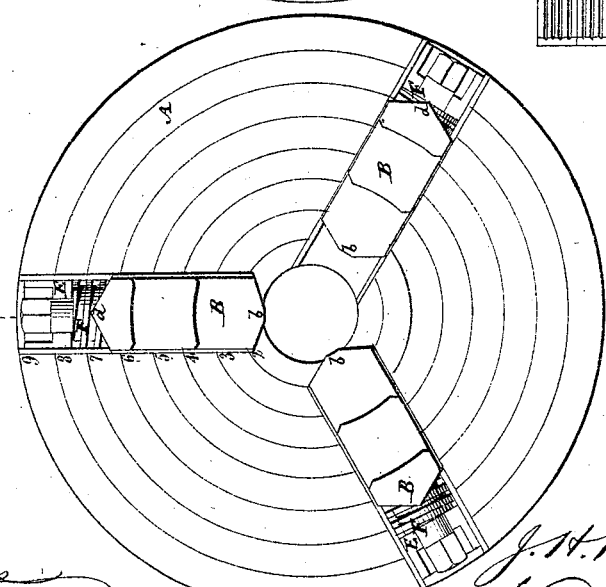
Witnesses:
Fred Haynes
Ferd Finck
J. H. Westcott,
per Wales Brown & Allen
Attorneys

UNITED STATES PATENT OFFICE.

JOHN H. WESTCOTT, OF ONEIDA, NEW YORK.

IMPROVEMENT IN CHUCKS.

Specification forming part of Letters Patent No. 136,349, dated February 25, 1873.

*To all whom it may concern:*

Be it known that I, JOHN H. WESTCOTT, of Oneida, in the county of Madison and State of New York, have invented an Improvement in Chucks, of which the following is a specification:

This invention consists in a combination of certain devices whereby a chuck, which is both universal and independent as regards the action of its dogs, is obtained, without displacement or detachment of its parts, for the purpose of admitting of the convenient adjustment of the chuck to concentric or eccentric work.

In the accompanying drawing, which forms part of this specification, Figure 1 represents a face view of a lathe-chuck constructed in accordance with my improvement, and showing one of the dogs in eccentric adjustment; Fig. 2, a similar view of the chuck with the several dogs reversed, and all in concentric relation; Fig. 3, a section on the line $x\,x$; and Fig. 4, an edge view in part.

Similar letters of reference indicate corresponding parts.

A is the face-plate of the chuck, and B B its dogs, of which there may be any desired number, and which are made capable of radial adjustment collectively, as in other universal chucks, by means of a scroll-faced ring, C, entered within the face-plate A from its back and held in place by a nut, D; but said ring, which turns within the face-plate instead of gearing by the scroll on its face in a direct manner with the dogs, does so indirectly through radial slides or boxes E and intervening screws F, said screws having their bearings in said boxes, so as to be capable of longitudinal movement only in common with the boxes, and fitting by their threads the backs of the dogs B, which are suitably threaded for the purpose, and form, as it were, half or partial nuts to the screws F. The dogs B, as well as the boxes E, are guided and retained in place, with freedom of radial adjustment either collectively or separately, by means of side ribs or grooves, and a corresponding construction of the radial slots or openings in the face-plate, within which the dogs and boxes move.

In the operation of the chuck the turning of the scroll-ring C effects the universal radial adjustment of the dogs B—the dogs B, screws F, and boxes E all moving in common. The independent adjustment of the dogs is effected by turning their respective screws F, whereby either one or more of the dogs may be adjusted to occupy an eccentric relation to the rest to accommodate eccentric or irregular-shaped work, such independent adjustment being made without detaching or displacing any of the parts.

The dogs are of a stepped construction to hold different diameters or sizes of work without having recourse to an extreme adjustment of the dogs. This construction also gives a long and short griping-surface at the ends $b\,d$ of the dogs, the longer or deeper ends $d$ answering to hold very small work or tools, such as drills, said dogs being reversible end for end, as required.

Apart from the independent as well as universal adjustment of the dogs without detachment or displacement of the parts, as specified, a chuck constructed as described is capable of holding the smallest as well as largest sized bodies of various shapes without being inconsistently large and heavy.

Instead of the scroll-ring C any other means may be employed for effecting the universal adjustment of the dogs, such as the various substitutes or equivalents common to other universal chucks.

What is here claimed, and desired to be secured by Letters Patent, is—

The combination of the screws F, the radial sliding boxes E, and dogs B with the face-plate A and scroll-ring C, or its equivalent, substantially as and for the purposes herein set forth.

JOHN H. WESTCOTT.

Witnesses:
 JAMES A. BENNETT,
 J. E. FERRY.